US010180251B2

(12) United States Patent
Duque

(10) Patent No.: US 10,180,251 B2
(45) Date of Patent: Jan. 15, 2019

(54) POWER STAND WITH SWITCHABLE POWER AND CHANGEABLE UTILITY MODELS

(71) Applicant: Michael Duque, Oxnard, CA (US)

(72) Inventor: Michael Duque, Oxnard, CA (US)

( * ) Notice: Subject to any disclaimer, the term of this patent is extended or adjusted under 35 U.S.C. 154(b) by 0 days.

(21) Appl. No.: 15/656,865

(22) Filed: Jul. 21, 2017

(65) Prior Publication Data

US 2018/0023802 A1    Jan. 25, 2018

Related U.S. Application Data

(60) Provisional application No. 62/365,243, filed on Jul. 21, 2016.

(51) Int. Cl.
| | |
|---|---|
| F21V 33/00 | (2006.01) |
| H02J 5/00 | (2016.01) |
| H02J 7/02 | (2016.01) |
| H04H 20/71 | (2008.01) |
| H04H 40/27 | (2008.01) |
| F21V 23/06 | (2006.01) |
| F21S 6/00 | (2006.01) |
| H02J 7/00 | (2006.01) |
| F21V 17/00 | (2006.01) |

(52) U.S. Cl.
CPC .......... *F21V 33/0056* (2013.01); *F21S 6/002* (2013.01); *F21V 23/06* (2013.01); *H02J 5/005* (2013.01); *H02J 7/0027* (2013.01); *H02J 7/0042* (2013.01); *H02J 7/0052* (2013.01); *H02J 7/0054* (2013.01); *H02J 7/025* (2013.01); *H04H 20/71* (2013.01); *H04H 40/27* (2013.01); *F21V 17/002* (2013.01); *H02J 2007/0062* (2013.01)

(58) Field of Classification Search
CPC ..... F21V 33/0056; F21V 23/06; H04H 20/71; H04H 20/27; F21S 6/002; H02J 7/025; H02J 7/0027; H02J 7/005
See application file for complete search history.

(56) References Cited

U.S. PATENT DOCUMENTS

| | | |
|---|---|---|
| D331,915 S | 12/1992 | Martin |
| D379,085 S | 5/1997 | Mackay |
| D383,439 S | 9/1997 | Tremmel |
| 6,165,010 A * | 12/2000 | Prazoff ................ H01R 25/168 362/421 |

(Continued)

OTHER PUBLICATIONS http://blog.tulsatvmemories.com/8-usb-tuner-turns-pc-into-fm-radiorecorder/, $8 USB Tunter Tunrs PC Into FM Receiver, Tulsa TV Memories Blog, Mar. 14, 2015.*

(Continued)

*Primary Examiner* — Daniel I Walsh
(74) *Attorney, Agent, or Firm* — Law Office of Jeff Williams; J. Oliver Williams

(57) ABSTRACT

A modular power stand system is disclosed. The system includes a set of modules having varied functionality that are configured to be plugged into and removable from a base unit. The system includes a main module integrally formed into the base unit and used to regulate operation of other modules. The modules are operable to perform any number of tasks, such as providing music, charging an electronic device, and acting to provide additional plug ports. Power is provided to the system via a cord or plug via an central area.

18 Claims, 5 Drawing Sheets

(56) References Cited

U.S. PATENT DOCUMENTS

| | | | |
|---|---|---|---|
| D460,420 S | 7/2002 | Whipple | |
| D472,521 S | 4/2003 | Giesbrecht | |
| 6,923,688 B1* | 8/2005 | Burson | H01R 13/2421 |
| | | | 439/218 |
| 7,524,197 B2* | 4/2009 | Mills | G06F 1/1632 |
| | | | 381/334 |
| 7,553,038 B2* | 6/2009 | Yao | G06F 1/182 |
| | | | 362/362 |
| 8,167,633 B1* | 5/2012 | Wu | H01R 35/025 |
| | | | 439/164 |
| D720,288 S | 12/2014 | Ko | |
| D720,289 S | 12/2014 | Chiang | |
| D738,823 S | 9/2015 | Chen | |
| 9,124,056 B1* | 9/2015 | Lewis, Jr. | H01R 39/64 |
| D741,256 S | 10/2015 | Murphy-Reinhertz | |
| D748,578 S | 2/2016 | Takagi | |
| D758,168 S | 6/2016 | Gartner | |
| D770,881 S | 11/2016 | Gartner | |
| 9,577,467 B1* | 2/2017 | Karanikos | H02J 7/025 |
| D784,259 S | 4/2017 | Huang | |
| 10,038,332 B1* | 7/2018 | Leabman | H02J 7/025 |
| 2002/0062287 A1* | 5/2002 | Katz | G06Q 30/0603 |
| | | | 705/51 |
| 2003/0235039 A1* | 12/2003 | Chen | G06F 1/189 |
| | | | 361/728 |
| 2005/0189910 A1* | 9/2005 | Hui | H01F 17/0006 |
| | | | 320/108 |
| 2005/0236243 A1* | 10/2005 | Huang | H02G 11/02 |
| | | | 191/12.4 |
| 2006/0226726 A1* | 10/2006 | Shim | H02K 7/1853 |
| | | | 310/166 |
| 2006/0259677 A1* | 11/2006 | Rosenfield | G06F 3/16 |
| | | | 710/313 |
| 2007/0026694 A1 | 2/2007 | Mayer | |
| 2008/0194121 A1* | 8/2008 | Chang | G06F 1/1632 |
| | | | 439/59 |
| 2008/0258642 A1* | 10/2008 | Patel | F21S 6/002 |
| | | | 315/246 |
| 2008/0258679 A1* | 10/2008 | Manico | H02J 50/10 |
| | | | 320/106 |
| 2008/0304304 A1* | 12/2008 | Cheng | G06F 1/266 |
| | | | 363/146 |
| 2009/0200984 A1* | 8/2009 | Meincke | H04R 25/602 |
| | | | 320/107 |
| 2010/0075517 A1* | 3/2010 | Ni | G06K 19/07732 |
| | | | 439/131 |
| 2010/0264871 A1* | 10/2010 | Matouka | H02J 7/025 |
| | | | 320/108 |
| 2010/0321939 A1* | 12/2010 | Patel | F21S 6/002 |
| | | | 362/253 |
| 2011/0050164 A1* | 3/2011 | Partovi | H01F 5/003 |
| | | | 320/108 |
| 2011/0177703 A1* | 7/2011 | Lin | A47B 21/06 |
| | | | 439/131 |
| 2012/0078413 A1* | 3/2012 | Baker, Jr. | G07F 17/12 |
| | | | 700/232 |
| 2012/0169276 A1* | 7/2012 | Wang | H02J 7/0042 |
| | | | 320/108 |
| 2012/0190412 A1* | 7/2012 | Buniatyan | H04M 19/08 |
| | | | 455/573 |
| 2012/0268064 A1* | 10/2012 | Ostrom | G06F 1/26 |
| | | | 320/108 |
| 2012/0293921 A1* | 11/2012 | Makwinski | H02G 3/0608 |
| | | | 361/624 |
| 2012/0320546 A1* | 12/2012 | Wu | H01R 31/065 |
| | | | 361/755 |
| 2013/0043827 A1* | 2/2013 | Weinstein | H02J 7/0027 |
| | | | 320/103 |
| 2013/0069583 A1* | 3/2013 | Lemelman | G06F 1/1635 |
| | | | 320/107 |
| 2013/0193911 A1* | 8/2013 | Miller | H02J 7/0042 |
| | | | 320/107 |
| 2013/0200841 A1* | 8/2013 | Farkas | H02J 7/0042 |
| | | | 320/107 |
| 2013/0257361 A1* | 10/2013 | Chen | H02J 7/0042 |
| | | | 320/108 |
| 2013/0278207 A1* | 10/2013 | Yoo | H02J 7/0052 |
| | | | 320/108 |
| 2014/0111948 A1* | 4/2014 | Ma | A45B 3/00 |
| | | | 361/729 |
| 2015/0162767 A1* | 6/2015 | Oh | H02J 7/0044 |
| | | | 320/108 |
| 2015/0180254 A1* | 6/2015 | Zhao | H02J 7/0052 |
| | | | 320/107 |
| 2015/0296645 A1* | 10/2015 | Sam | G06F 1/1632 |
| | | | 361/679.32 |
| 2015/0349555 A1* | 12/2015 | Ortiz Baeza | H02J 7/0044 |
| | | | 320/111 |
| 2016/0003466 A1* | 1/2016 | Chien | F21V 33/0004 |
| | | | 362/234 |
| 2016/0043584 A1* | 2/2016 | Sun | H01M 2/1044 |
| | | | 320/107 |
| 2016/0049816 A1* | 2/2016 | Yang | G06F 1/266 |
| | | | 320/107 |
| 2016/0091196 A1* | 3/2016 | Chien | F21V 33/0048 |
| | | | 362/253 |
| 2016/0097522 A1* | 4/2016 | Chien | F21V 33/00 |
| | | | 362/183 |
| 2016/0097525 A1* | 4/2016 | Chien | F21V 33/004 |
| | | | 362/135 |
| 2016/0099595 A1* | 4/2016 | Chien | H02J 7/0052 |
| | | | 362/253 |
| 2016/0099596 A1* | 4/2016 | Chien | H02J 7/0052 |
| | | | 368/10 |
| 2016/0153650 A1* | 6/2016 | Chien | F21V 33/0004 |
| | | | 362/253 |
| 2016/0186973 A1* | 6/2016 | Chien | F21S 8/035 |
| | | | 362/253 |
| 2016/0202743 A1* | 7/2016 | Li | G06F 1/26 |
| | | | 710/313 |
| 2016/0224064 A1* | 8/2016 | Fleisig | G06F 1/1632 |
| 2017/0054315 A1* | 2/2017 | Chien | F21S 8/035 |
| 2017/0093198 A1* | 3/2017 | Graham | H02J 7/025 |
| 2017/0126039 A1* | 5/2017 | Nguyen | H02J 7/0052 |
| 2017/0126048 A1* | 5/2017 | Wang | H02J 7/025 |
| 2017/0155259 A1* | 6/2017 | Mecca | H02J 7/0044 |
| 2017/0214783 A1* | 7/2017 | Filser | H04M 1/72527 |
| 2017/0293334 A1* | 10/2017 | Pelissier | G06F 1/266 |
| 2018/0023802 A1* | 1/2018 | Duque | F21V 33/0056 |
| | | | 362/413 |

OTHER PUBLICATIONS http://www.core77.com/posts/26798/A-Short-Lived-USB-LED-Fan-Clock, A Short-Lived USB LED Fan Clock, Rain Noe, Apr. 18, 2014.*
Non-Final Office Action in related U.S. Appl. No. 29/562,527, dated Sep. 11, 2017, 10 pages.
Examination Report in related European Union Intellectual Property Office application 003515600-0001, dated Feb. 16, 2017, 2 pages.
Examination Report in related European Union Intellectual Property Office application 003515600-0001, dated Dec. 22, 2016, 2 pages.

* cited by examiner

POWER STAND WITH SWITCHABLE POWER AND CHANGEABLE UTILITY MODELS

CLAIM OF PRIORITY

This application claims the benefit of U.S. Provisional Application No. 62/365,243, filed 21 Jul. 2017. The information contained therein is hereby incorporated by reference.

BACKGROUND

1. Field of the Invention

The present application relates generally to a light stand device, and in particular to a powered system having multiple interchangeable modules to accommodate the needs of the user.

2. Description of Related Art

Lighting devices have been around for many years. They come in various sizes and designs. Typically lighting devices, such as lamps, rest on small tables to provide lighting for an individual. In other embodiments, lighting devices are secured to ceilings and even rest on the floor. In order to produce the necessary light for a user, they are plugged into a wall or receive power from a battery. When located on a piece of furniture (i.e. table), lighting devices tend to take a considerable amount of room on the furniture top thereby limiting the room for other electronic devices. Additionally, the use of multiple electronic devices in a single location can be hindered by limited outlet power recepticles. Common examples of other electronic devices are clocks, stereos, chargers, and more.

A common issue found today is that a large number of people use portable electronic devices. These devices need to be plugged into a power source to be recharged. A solution today is seen in hotels where lighting devices are secured to a wall that have one or more outlets to plug an electronic device into. However, these are only useful adjacent a wall and cannot be moved around a room or to a remote location. Power strips are another device often used that grants a user a plurality of plugs for a plurality of devices while only consuming a single wall outlet spot. Although they are portable, these power strips are not interactive or functional outside of providing plugs.

A new type of system is needed that allows a user full portability while incorporating locations for providing powered plugs to work with electronic devices and interactive capabilities. Although great strides have been made with respect to powering lighting fixtures and incorporating power plugs, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
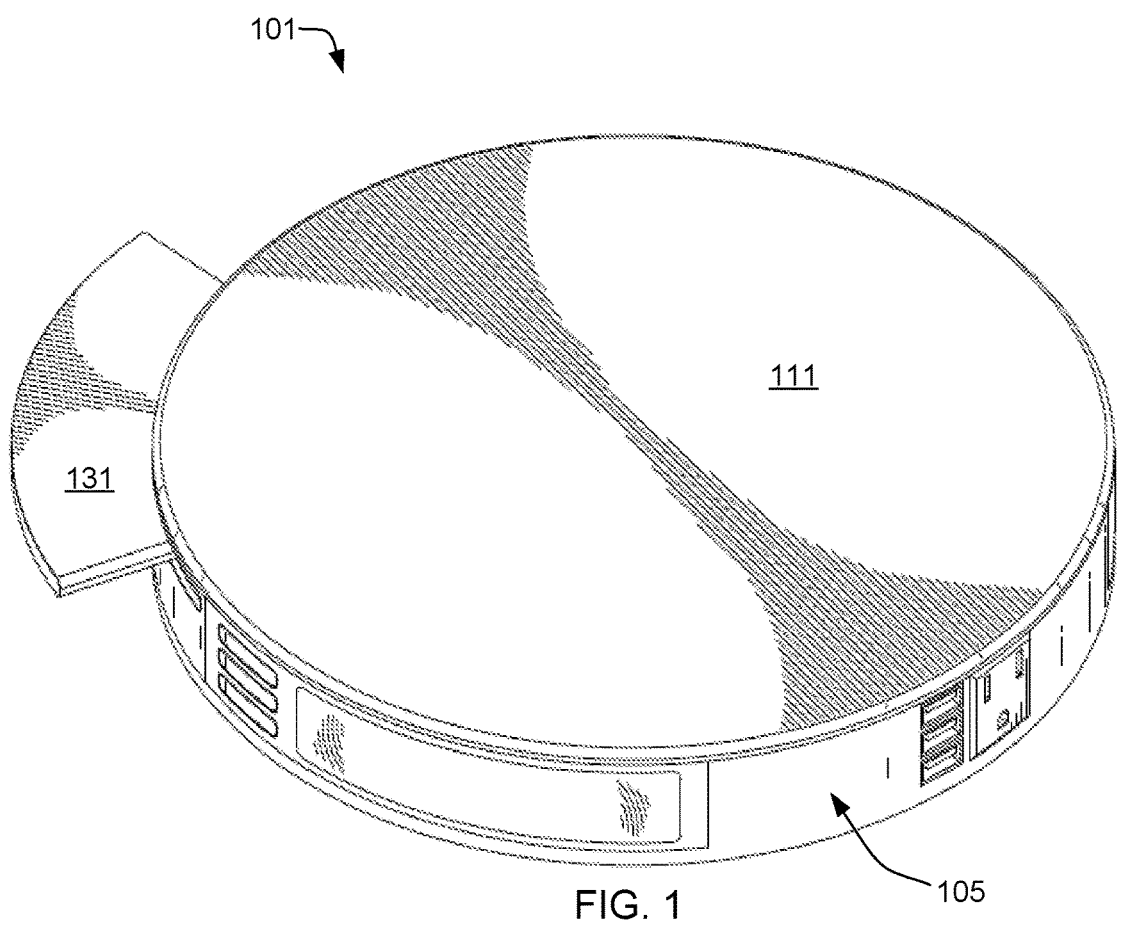
FIG. 1 is a perspective view of a power stand system according to an embodiment of the present application.
Figure 2:
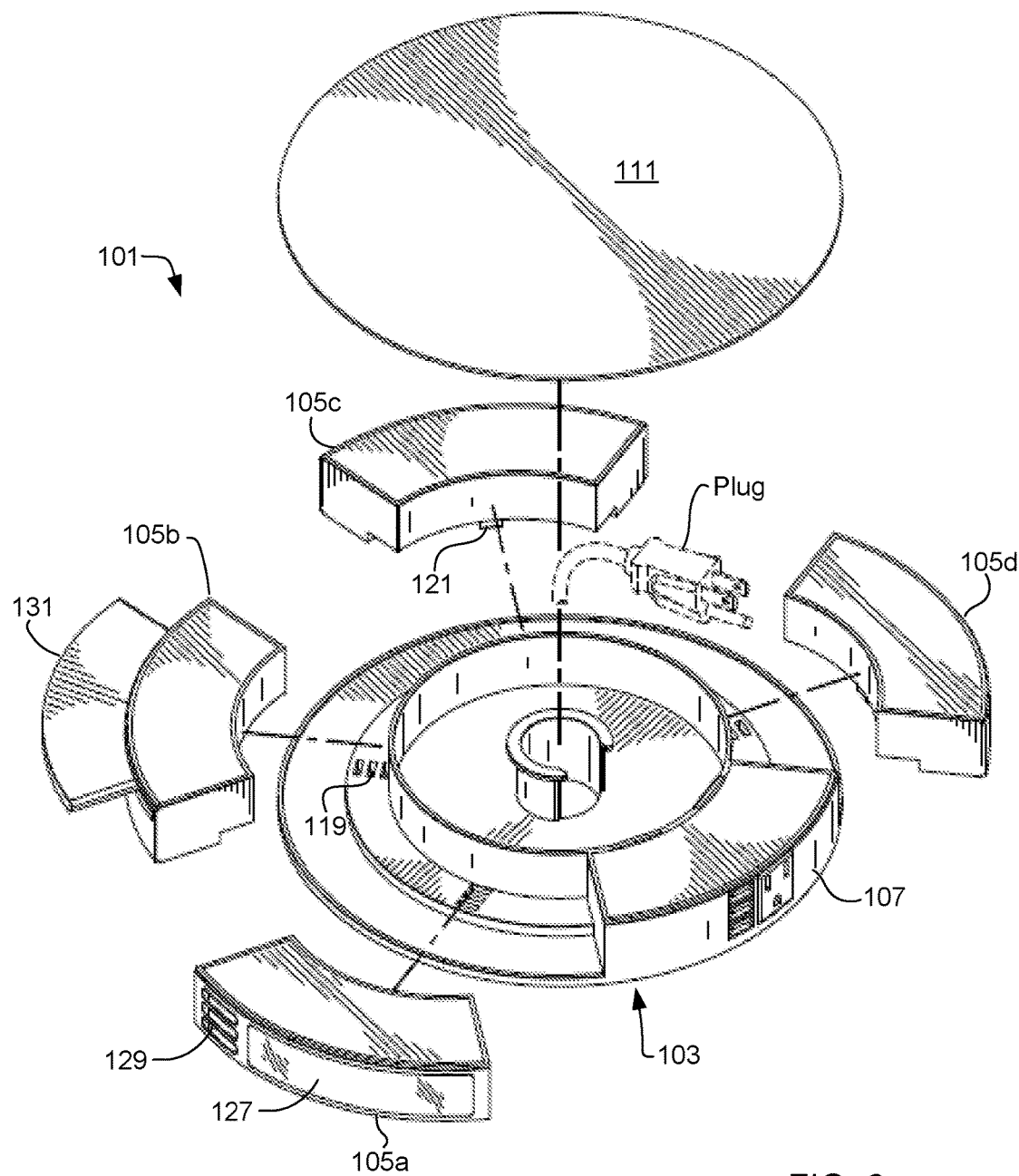
FIG. 2 is an exploded perspective view of the power stand system of FIG. 1.
Figure 3:
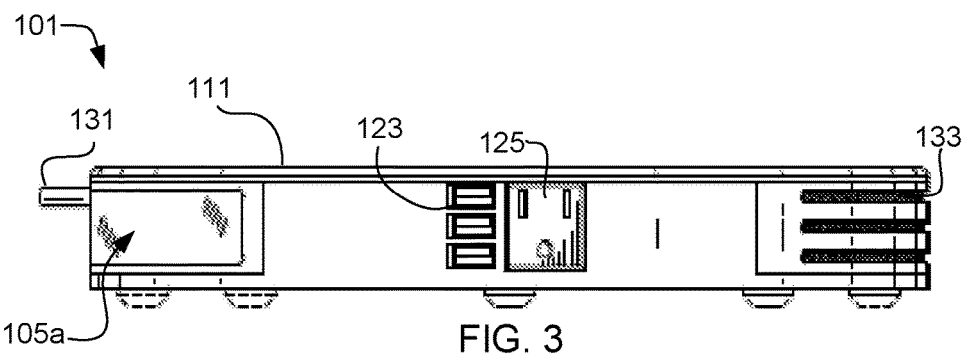
FIG. 3 is a front view of the power stand system of FIG. 1.
Figure 4:
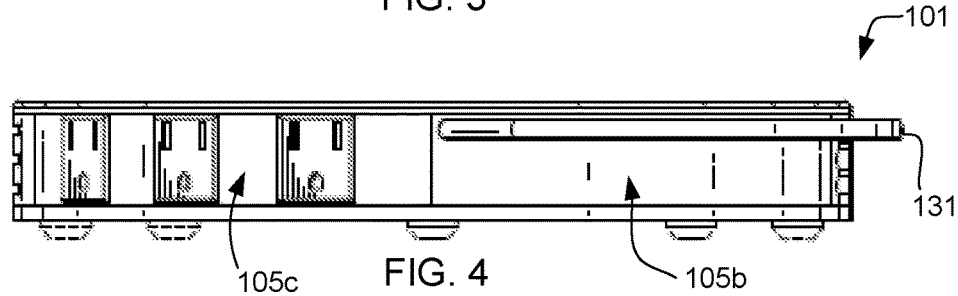
FIG. 4 is a back view of the power stand system of FIG. 1.
Figure 5:
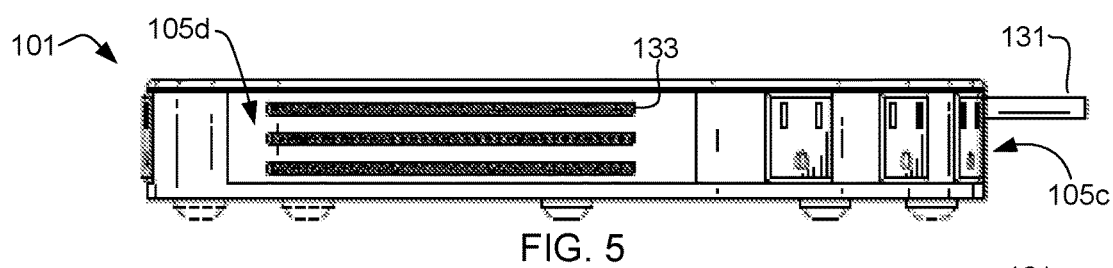
FIG. 5 is a right view of the power stand system of FIG. 1.
Figure 6:
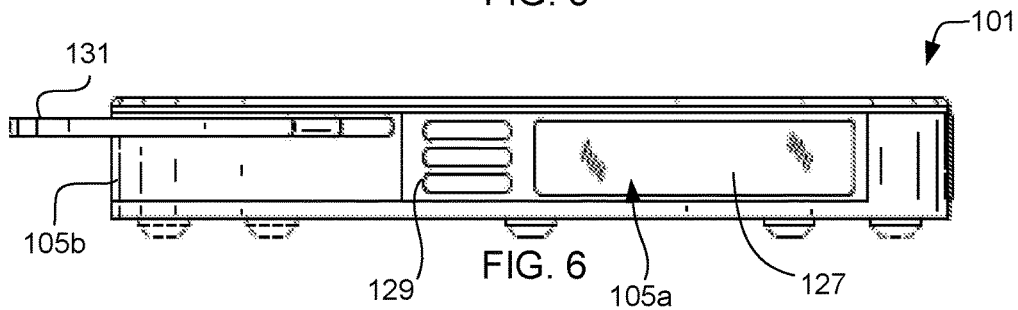
FIG. 6 is a left view of the power stand system of FIG. 1.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with conventional lighting devices and power strips. Specifically, the power stand system with selectable power and audio controls is configured to be portable for locating by the user as needed. Additionally, the system is configured to be interactive with an assortment of varied portable electronic devices, such as phones, tablets, music players, and so forth. Furthermore, the system of the present application is configured to be modular so as to provide the user with an ability to customize its functions according to desire and need. These and other unique features of the device are discussed below and illustrated in the accompanying drawings.

The system and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application is illustrated in the associated drawings. The system and method of the present application includes a base member having a plurality of connection ports for the selective coupling of one or more modules. The system includes a plurality of modules that are configured to perform or provide a unique feature. The modules can be interchanged as necessary. Additionally, a main module is included with the base to permit communication and interaction with the various electronic devices and associated modules. Additional features and functions of the device are illustrated and discussed below.

Referring now to FIGS. 1-8 in the drawings, a power stand system with switchable power and changeable utility modules is illustrated in varied views. Power stand system 101 is configured to include a base member 103 and a plurality of modules 105. Each module 105a-d is configured to electrically couple and communicate through base member 103 and facilitate a particular function. A main module 107 is integral within base member 103 and is used to regulate and synchronize the functions of all modules 105a-d.

Figure 7:
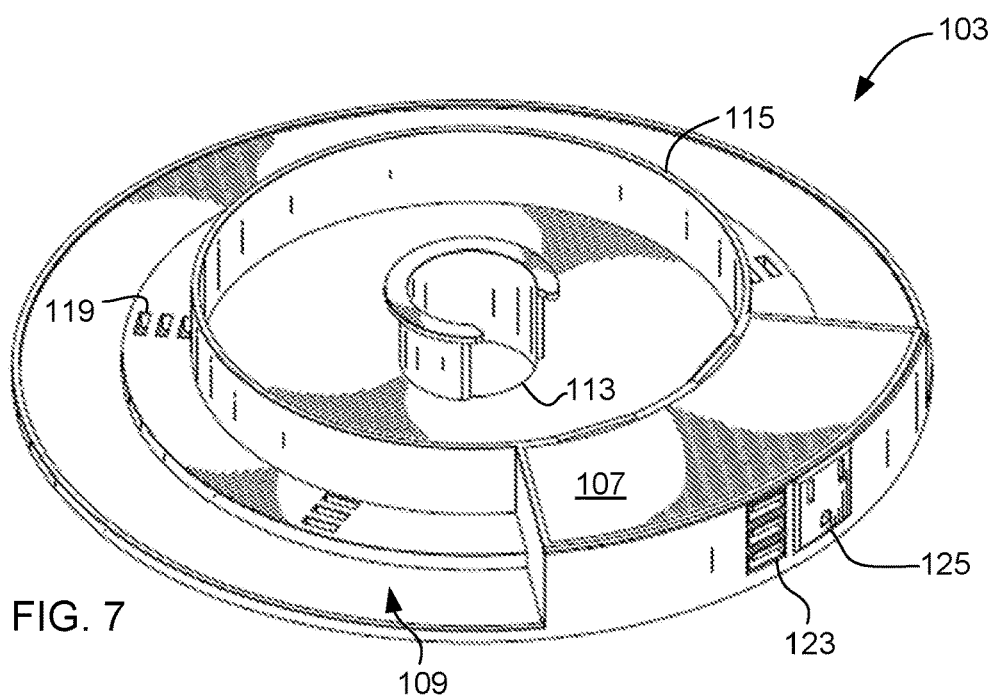
FIG. 7 is a perspective view of a base in the power stand system of FIG. 1.
Figure 8:
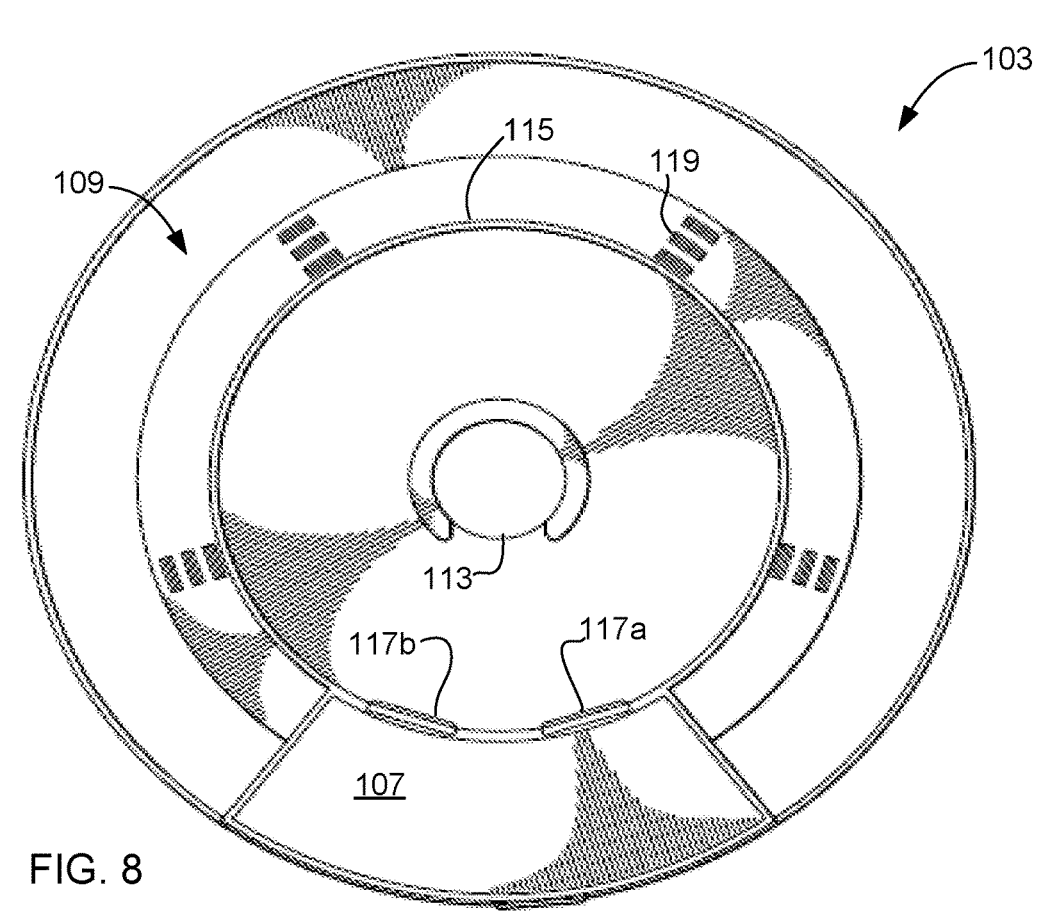
FIG. 8 is a top view of the base of FIG. 7.

As seen in particular with FIGS. 7 and 8 in the drawings, base member 103 is illustrated in more clarity. Base member 103 includes main module 107 and a track 109 configured to accept additional modules 105a-d. System 103 includes a cover 111 shown in greater detail in FIGS. 2 and 3. Cover 111 is configured to rest over module 107 and track 109 to present a suitable and stable base for the resting of a lighting device and/or any other electronic device or object. Cover 111 may also be a touch sensitive surface which controls various functions of modules 105 and power sources through various plugs. The touch sensitive surface may be regulated through any of modules 107 and 105. Modules 105a-d are not necessary for module 107 to operate. Where module 107 is the sole module in use, cover 111 incorporates one or more protrusions or flanges sufficient to selectively engage track 109 and create a stable surface.

Additionally, blank module units may be placed on member 103 in place of modules 105 so as to allow cover 111 a proper fit and finish. Blank modules are structurally similar to modules 105 in shape and form. Blank modules are void of interactive functions to engage a user. For example, a blank module fails to interact directly with a user. A blank module fails to have any external port, connection, switch, or display to interact with a user. Also, a blank module fails to directly receive or transmit electronic communications to and from a remote electronic device of the user. Blank modules may include electronical components for interaction with other modules.

It should be stated initially that the overall shape of system 101 is not herein limited to that of a circle. Other shapes are considered equally conceived within the scope of the present application. A circular shape lends itself to the shape of a large number of lighting devices (i.e. lamps). Rectangular, octagonal, pentagonal, and other shapes are also possible. Additionally, any number of modules 105 may be used as such number may only be limited by the overall shape and size of base member 103.

Base member 103 is configured to receive power from an outside power source typically (i.e. power cord not shown). It is understood that power may also be provided through module 107 via a battery. Such battery is useful primarily as a power backup in times of outages. It may be recharged when plugged into the outside power source (i.e. power grid via outlet on wall). Member 103 includes a central aperture 113 configured to accept the passage of plugs into a central area. The central area is the volume of space within module 107 and rim 115. Rim 115 is optional and may be eliminated to allow for the user to access rear portions of each module 105 from the central area. The male end of a plug is permitted to pass through aperture 113 and plug into a female socket 117 along an internal surface of module 107. This plug may be associated with a lamp or any device that draws power. Alternatively, this plug may be used to provide power to system 101. Power may then be transferred within system 101 to modules 105 and other devices associated with adjacent plugs. Extra space in the central area may be used for storage or excess cable management.

One or more female sockets 117 may be located within the central area along module 107. Sockets 117 may include an appliance outlet socket, any adapter, a USB socket, or other type of connector. Additionally, the purpose and function of such sockets 117 may be different between them. Socket 117a may be used to permit operation of the lighting device plugged therein via touch with cover 111. The other socket 117b may only provide the transfer of power with not additional functional capabilities.

Within track 109 are a plurality of connection ports 119. These connection ports are configured to engage with corresponding plugs 121 along a lower side of each module 105a-d. Modules 105 and module 107 are in electrical communication through ports 119. Ports 119 and corresponding plugs 121 are located in any portion of their respective bodies and are situated in such a manner as to allow each module to be respectfully removed and inserted as desired. It is ideally situated such that each module may be removed and inserted without interference to neighboring modules. Each module 105 may be configured to engage one or more ports 119. It is understood that modules 105 may be interchanged in location about track 109. Additionally they each may be removed and replaced by any other module type. This modular functionality allows each system 101 to be fully customizable to a particular user's set of needs.

Data is transferred between modules 105a-d and module 107 via ports 119. Module 107 is configured to include one or more processors and communication devices to permit for the proper operational control of modules 105a-d. Portable electronic devices are able to communicate to module 107 via all known methods. Such methods may include at least the following: wireless communication methods, wired methods, Blue-tooth, infrared, beaming, and so forth. Wired communications may be made via sockets located on an outer or inner surface of module 107 or any other module 105. Sockets 123 and 125 are provided as exemplary embodiments. Socket 125 is configured to provide power only to a device plugged in. Socket 123 is configured to allow 2-way communication between module 107 and the electronic device. A user may elect to plug his cell phone into socket 123 to recharge his battery while also allowing the phone to regulate operations of system 101 via module 107. Alternatively, a user may elect to regulate the operations of system 101 via wireless communications with circuitry within module 107 or any of the other modules.

As seen in FIGS. 2-6 in the drawings, different types of modules are possible. Modules 105a-d are representative in nature and serve as examples. The precise embodiments are not herein limited. Module 105a is an electronic device with a display 127 and a series of controls 129. Controls 129 adjust the functions of the module and the resulting information displayed on display 127. An example of module 105a is that of a digital clock and/or radio. Module 105a may be configured to include an internal antenna to permit the reception and broadcasting of radio wave signals.

Module 105b is a charging module. A charging plate 131 selectively extends and retracts within the module housing to allow for wireless charging of an electronic device. Module 105b is configured to receive electrical power through a connection port 119 and subsequently pass a portion of the electrical power to a remote electronic device.

Module 105c is a power supply module configured to provide one or more additional ports/sockets to plug external devices into. Any type of socket is permitted. Module 105c includes one or more outlet plug receptacles.

Module 105d is a speaker module, including a speaker 133. It is in communication with module 105a to play sound. Module 107 may selectively adjust control of module 105d to that of the electronic device of a user directly or through module 105a. It is understood that each module may be interchanged or removed as desired. For example, out of the four modules permitted in this particular configuration, three may be similar to module 105d and one may be similar to module 105a. In this way, the user is seeking to produce a better sound quality.

Figure 9:
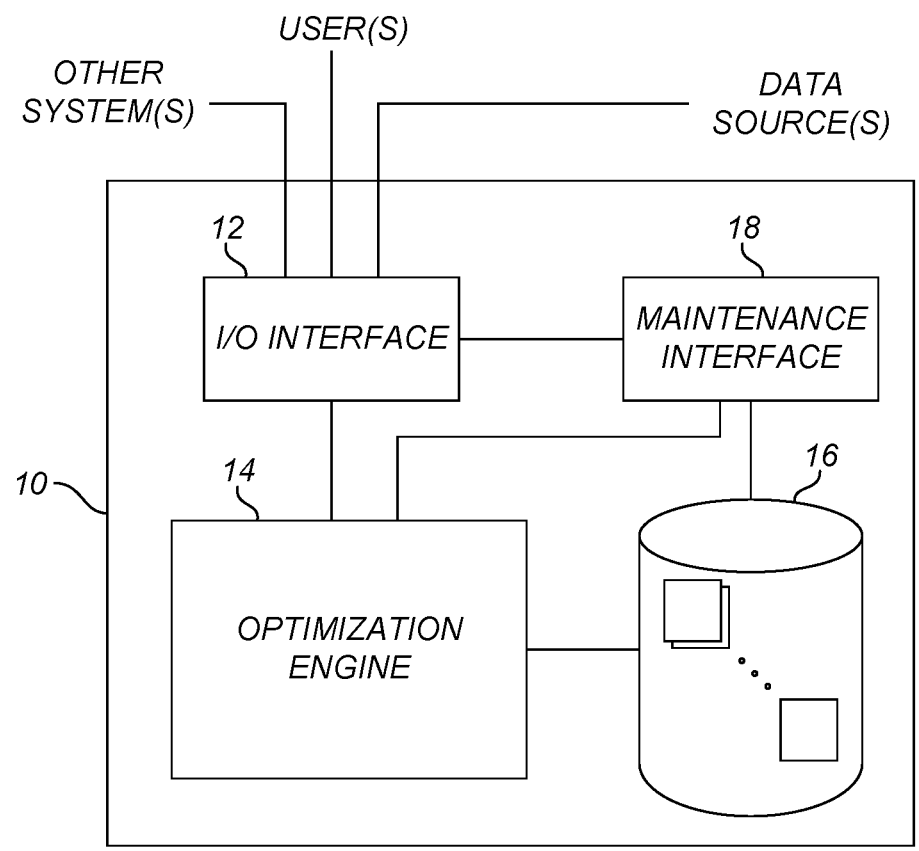
FIG. 9 is a schematic of an electronic hardware system used in the power stand system of FIG. 1.

Referring now also to FIG. 9 in the drawings, a schematic of an electronic hardware system is illustrated. System 10 is optionally included within modules 105 and 107 and may further represent a remote electronic device for interaction with system 101.

The device 10 includes at least one of an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of the device 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore, the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the device 10. The I/O interface 12 can be configured for allowing one or more users to input information to the device 10 via any known input device. Examples can include a keyboard, mouse, touch screen, microphone, and/or any other desired input device. The I/O interface 12 can be configured for allowing one or more users to receive information output from the device 10 via any known output device. Examples can include a display monitor, a printer, a speaker, and/or any other desired output device. The I/O interface 12 can be configured for allowing other systems to communicate with the device 10. For example, the I/O interface 12 can allow one or more remote computer(s) to access information, input information, and/or remotely instruct the device 10 to perform one or more of the tasks described herein. The I/O interface 12 can be configured for allowing communication with one or more remote data sources. For example, the I/O interface 12 can allow one or more remote data source(s) to access information, input information, and/or remotely instruct the device 10 to perform one or more of the tasks described herein via wired or wireless communications.

The database 16 provides persistent data storage for device 10. While the term "database" is primarily used, a memory or other suitable data storage arrangement may provide the functionality of the database 16. In alternative embodiments, the database 16 can be integral to or separate from the device 10 and can operate on one or more computers. The database 16 preferably provides non-volatile data storage for any information suitable to support the operation of the device 10.

The maintenance interface 18 is configured to allow users to maintain desired operation of the device 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the processor 14 and/or the I/O interface 12. This can include, for example, software updates and/or administrative tasks such as security management and/or adjustment of certain tolerance settings.

Particular advantages of system 101 include at least the following: (1) fully modular power stand; (2) easy to transport and compact in nature; (3) fully interactive with existing smart technology systems like portable electronic devices; and (4) a plurality of adaptable ports and sockets to increase function.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application.

Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A modular power stand system, comprising:
   a base unit;
   a first module integral with the base unit, the first module configured to transmit and receive electronic data;
   a track formed into the base unit, the track including a connection port;
   a second module configured to engage the connection port, the second module and the first module being in electronic communication through the connection port, the second module includes a charging plate that selectively extends and retracts within the second module, the charging plate is configured to permit wireless charging of a remote electronic device; and
   an aperture within the base unit configured to permit passage into a central area between the first and second modules and the base unit.

2. The system of claim 1, wherein the second module couples to a second connection port.

3. The system of claim 1, further comprising:
   a third module configured to couple to the base unit via a second connection port in the track.

4. The system of claim 3, wherein the second and the third modules can interchange locations around the track.

5. The system of claim 3, wherein the first module is configured to synchronize the functions of the second module and the third module.

6. The system of claim 1, wherein the second module is interchangeable from the base unit such that features and functions of the second module may be changed as needed.

7. The system of claim 1, wherein the first module includes a socket adjacent the central area.

8. The system of claim 7, wherein the socket is configured to receive power used to operate the first module.

9. The system of claim 1, further comprising:
   a cover to overlay across a portion of the base unit, the first module, and the second module.

10. The system of claim 3, wherein the third module is a digital clock.

11. The system of claim 10, wherein the third module is configured to receive and broadcast radio wave signals.

12. The system of claim 11, wherein the third module includes a speaker to broadcast the radio wave signals.

13. The system of claim 3, wherein the third module is a charging module configured to supply power to a remote electronic device.

14. The system of claim 3, wherein the third module is a power supply module including one or more outlet plug receptacles.

15. The system of claim 3, wherein the third module is a speaker module configured to receive and broadcast audible sound via a speaker.

16. The system of claim 15, wherein the third module receives at least one of audible data files and radio waves from the first module for playing through the speaker.

17. The system of claim 15, wherein the third module receives an electronic signal directly from a remote electronic device via an internal input/output interface.

18. The system of claim 3, wherein the third module is void of interactive functions to a user.

* * * * *